US012640892B2

(12) United States Patent
Zhang et al.

(10) Patent No.: US 12,640,892 B2
(45) Date of Patent: May 26, 2026

(54) USER EQUIPMENT SPECIFIC CONDITIONAL GUARD BAND REQUEST

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US)

( * ) Notice: Subject to any disclaimer, the term of this patent is extended or adjusted under 35 U.S.C. 154(b) by 444 days.

(21) Appl. No.: 18/166,307

(22) Filed: Feb. 8, 2023

(65) Prior Publication Data

US 2024/0267192 A1 Aug. 8, 2024

(51) Int. Cl.
H04L 5/00 (2006.01)
H04L 5/14 (2006.01)
H04W 72/0453 (2023.01)
H04W 72/51 (2023.01)

(52) U.S. Cl.
CPC .......... H04L 5/0092 (2013.01); H04L 5/0007 (2013.01); H04L 5/0073 (2013.01); H04L 5/14 (2013.01); H04W 72/0453 (2013.01); H04W 72/51 (2023.01)

(58) Field of Classification Search
None
See application file for complete search history.

(56) References Cited

U.S. PATENT DOCUMENTS

| | | | | |
|---|---|---|---|---|
| 2015/0011233 A1* | 1/2015 | Kazmi | ................ | H04W 72/044 |
| | | | | 455/454 |
| 2020/0235980 A1* | 7/2020 | John Wilson | ......... | H04L 5/0014 |
| 2021/0176626 A1* | 6/2021 | Abdelghaffar | ........ | H04W 76/27 |
| 2021/0409160 A1* | 12/2021 | Nam | ...................... | H04L 1/1887 |
| 2023/0073130 A1* | 3/2023 | He | ......................... | H04L 5/0044 |
| 2024/0155583 A1* | 5/2024 | Rudolf | .................. | H04L 5/0094 |
| 2024/0323936 A1* | 9/2024 | You | ........................... | H04L 5/14 |
| 2024/0373421 A1* | 11/2024 | Jang | ...................... | H04L 5/0012 |

* cited by examiner

*Primary Examiner* — Jenkey Van

(57) ABSTRACT

Certain aspects of the present disclosure provide techniques for user equipment (UE) specific conditional guard band requesting. An example method, performed by a UE, includes receiving signaling, from a network entity, indicating at least a first guard band in between subbands of at least a first pair of downlink and uplink subbands configured for subband full duplex (SBFD) communications within a slot, and transmitting, to the network entity, a request for at least a second guard band in between the subbands of at least the first pair of downlink and uplink subbands, if at least condition is met.

24 Claims, 13 Drawing Sheets

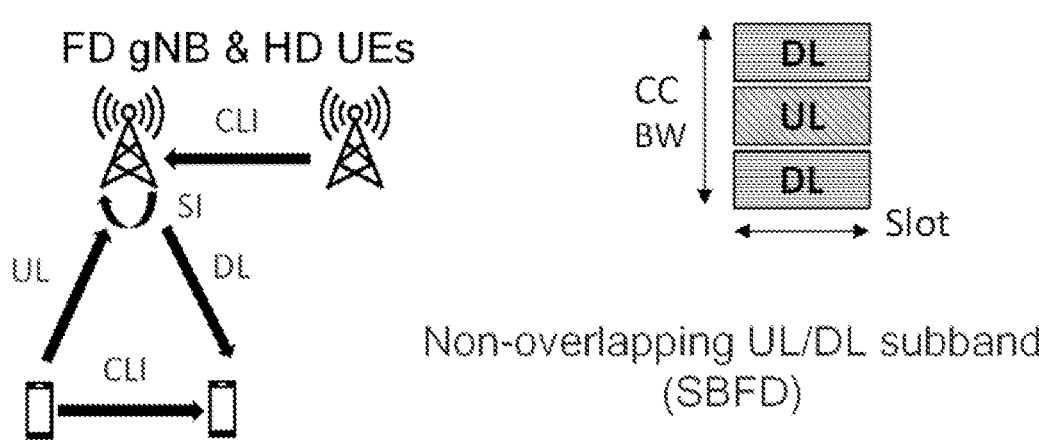
FIG. 6A
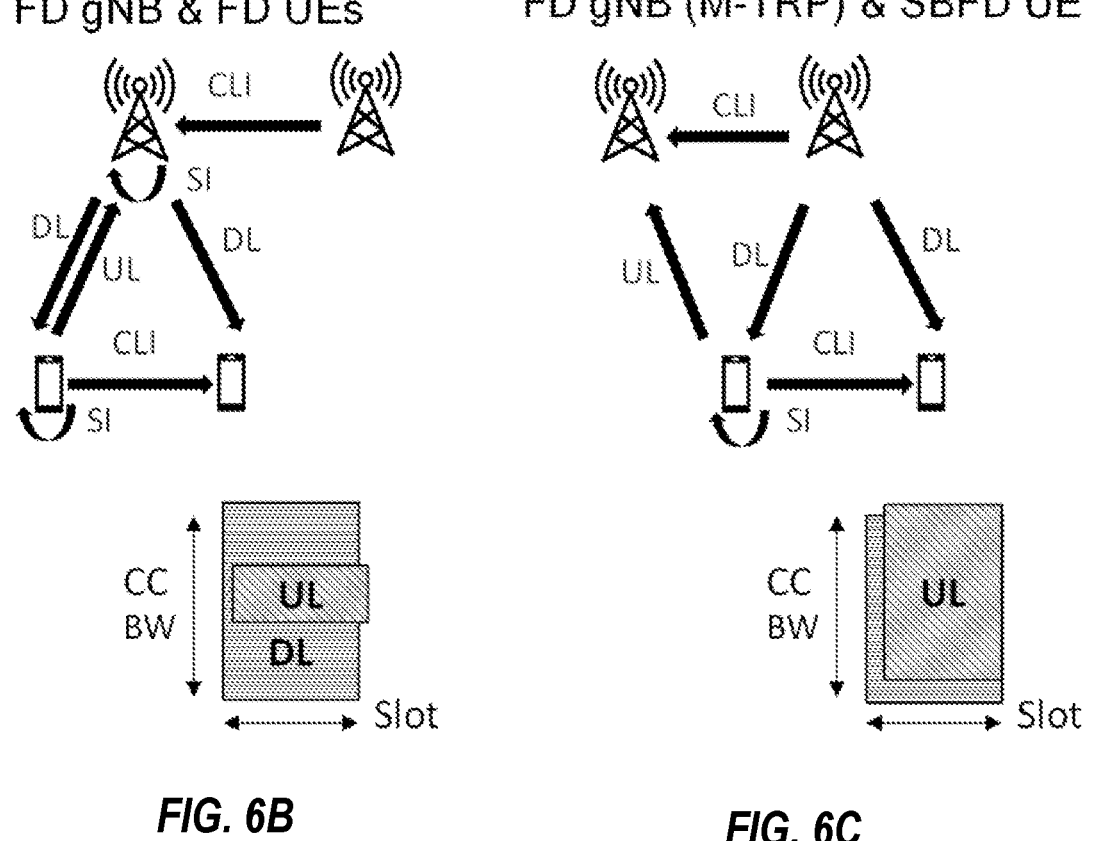
FIG. 6B                 FIG. 6C

800 ⟶

Full Duplex (FD) gNB performing simultaneous transmission and
reception on the same slot

900

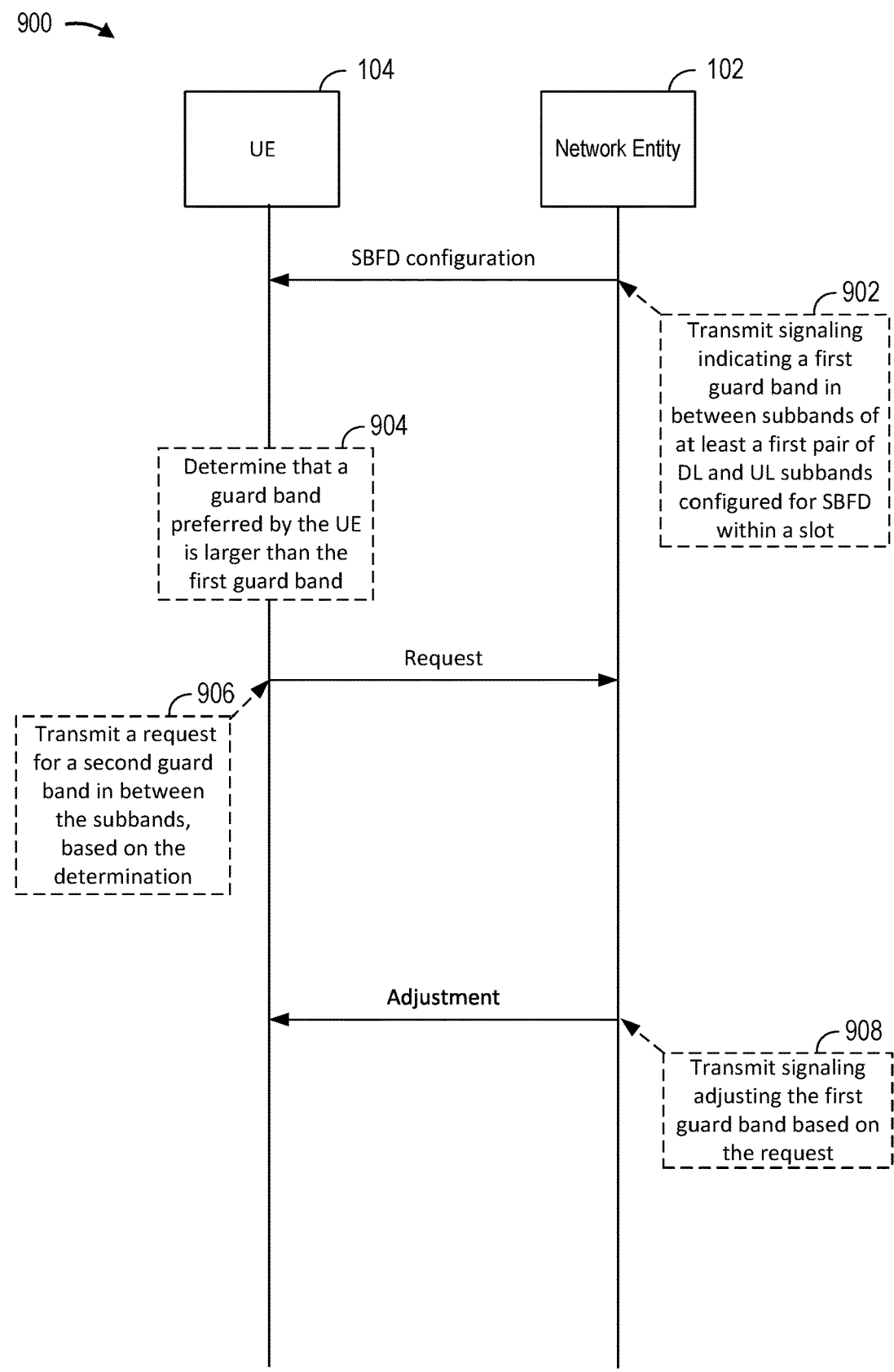

104

UE

102

Network Entity

SBFD configuration

902

Transmit signaling indicating a first guard band in between subbands of at least a first pair of DL and UL subbands configured for SBFD within a slot

904

Determine that a guard band preferred by the UE is larger than the first guard band Request

906

Transmit a request for a second guard band in between the subbands, based on the determination Adjustment

908

Transmit signaling adjusting the first guard band based on the request

*FIG. 9*

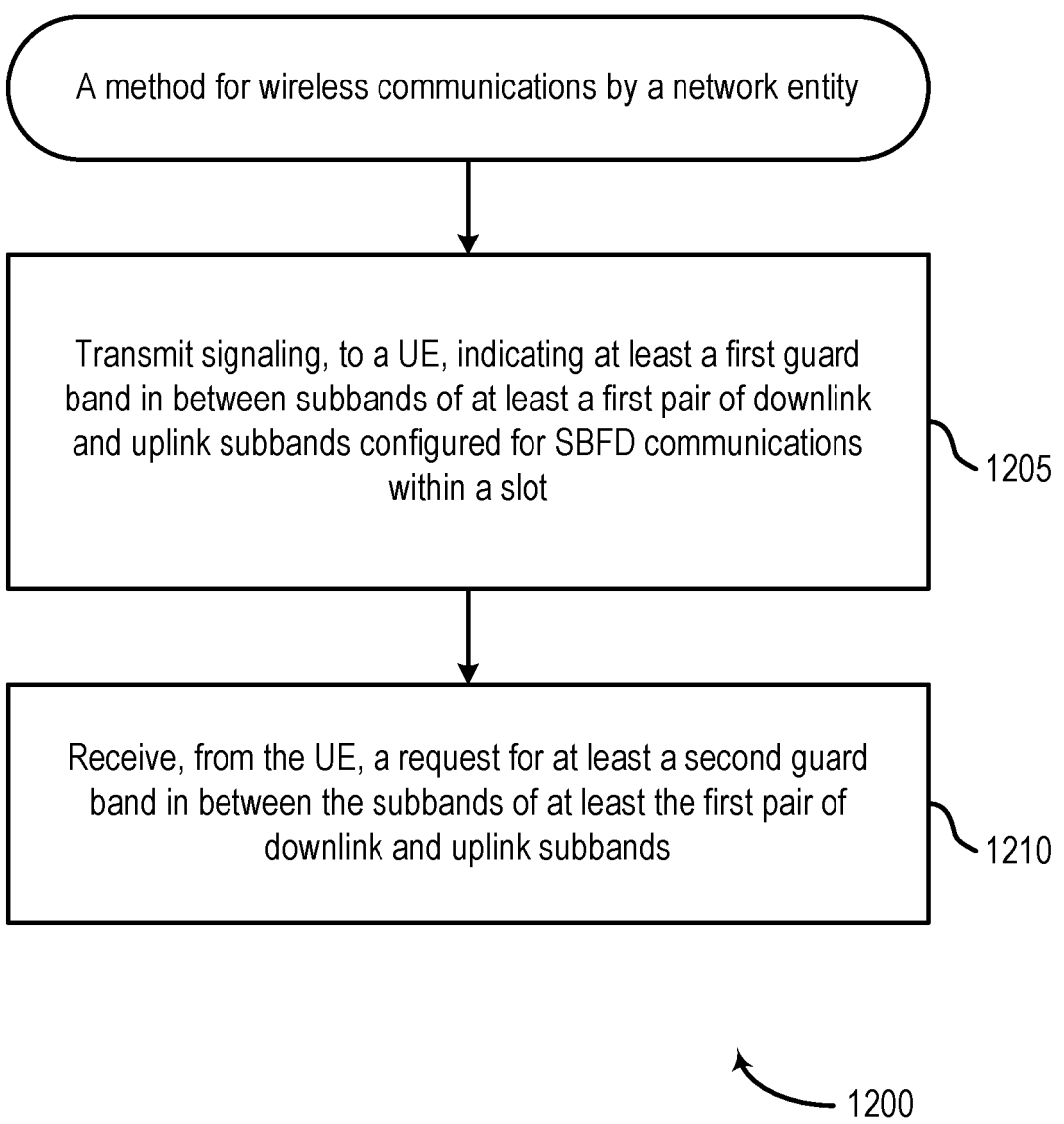

A method for wireless communications by a network entity

Transmit signaling, to a UE, indicating at least a first guard band in between subbands of at least a first pair of downlink and uplink subbands configured for SBFD communications within a slot

1205

Receive, from the UE, a request for at least a second guard band in between the subbands of at least the first pair of downlink and uplink subbands

USER EQUIPMENT SPECIFIC CONDITIONAL GUARD BAND REQUEST

BACKGROUND

Field of the Disclosure

Aspects of the present disclosure relate to wireless communications, and more particularly, to techniques for user equipment (UE) specific conditional guard band requesting.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes receiving signaling, from a network entity, indicating at least a first guard band in between subbands of at least a first pair of downlink and uplink subbands configured for subband full duplex (SBFD) communications within a slot; and transmitting, to the network entity, a request for at least a second guard band in between the subbands of at least the first pair of downlink and uplink subbands, if at least condition is met.

Another aspect provides a method for wireless communications by a network entity. The method includes transmitting signaling, to a UE, indicating at least a first guard band in between subbands of at least a first pair of downlink and uplink subbands configured for SBFD communications within a slot; and receiving, from the UE, a request for at least a second guard band in between the subbands of at least the first pair of downlink and uplink subbands.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 6A, 6B, and 6C depict various examples of full duplex configurations.

FIG. 9 depicts an example call flow diagram illustrating techniques for UE specific conditional guard band requesting, in accordance with certain aspects of the present disclosure.

FIG. 12 depicts a method for wireless communications.

DETAILED DESCRIPTION

Figure 1:
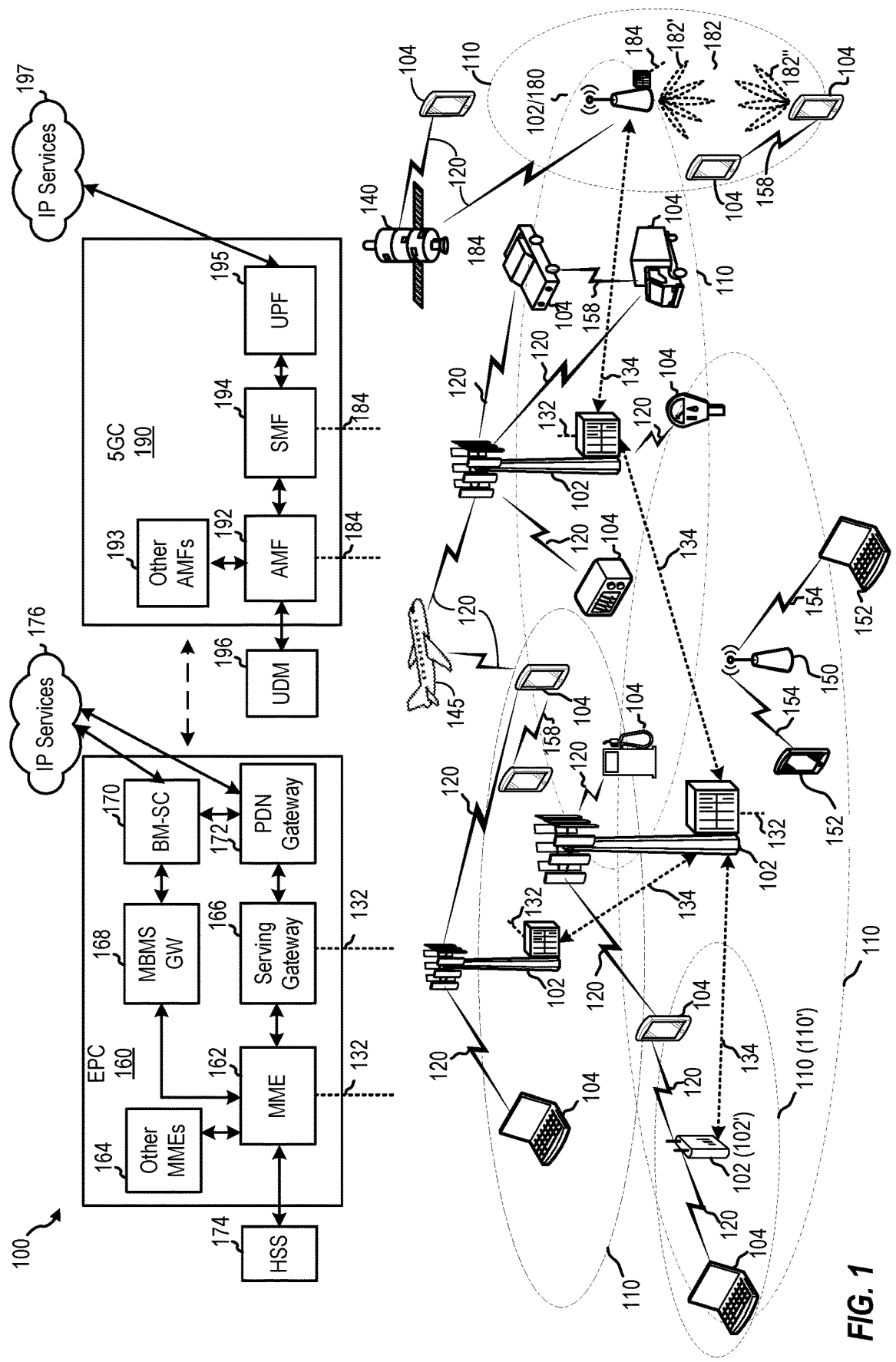
FIG. 1 depicts an example wireless communications network.

Aspects of the present disclosure provide apparatuses, methods, processing systems, and computer-readable mediums for user equipment (UE) specific conditional guard band requesting.

The term full duplex (FD) generally refers to simultaneous transmission and reception over a wireless medium. An FD device is, thus, capable of processing bi-directional transmissions at the same time. In contrast, a half-duplex (HD) device is only capable of transmitting or receiving, at one time, but not both.

If a user equipment (UE) is operating in HD mode and a network entity, such as a gNodeB (gNB), is operating in an FD mode, such as sub-band FD (SBFD) or in-band FD (IBFD), interference may occur at the UE and gNB from a number of sources. For example, this interference may include inter-cell interference (ICI) from other gNBs, intra-cell cross-link interference (CLI) from UEs in the same cell, and inter-cell CLI from UEs in adjacent cells. Self-interference may also occur for both FD UEs and FD gNBs. In the case of FD gNBs, for example, self-interference may refer to a downlink transmission interfering with reception of an uplink transmission. These sources of interference may cause significant issues, including decreased spectral efficiency, increased power consumption, and poor UE performance.

In SBFD communication, guard bands may be used to separate frequency resources allocated for downlink and uplink signaling. In SBFD, the downlink and uplink signals may be transmitted on different subbands within the same frequency band. The guard band is a portion of the spectrum that is not used for either downlink or uplink communication, but is instead reserved to separate the subbands used for downlink and uplink signaling, preventing interference between them and allowing for a more reliable and efficient use of the available spectrum.

The size of the guard band may depend on several factors, including a frequency band being used, a desired level of protection against interference, and a technology used to implement SBFD. In general, a larger guard band provides a higher degree of protection against interference, but also reduces the available bandwidth for communication. Thus, one potential challenge is how to balance the trade-off between protection against interference and bandwidth utilization in the design of SBFD systems.

Aspects of the present disclosure provide techniques that may increase flexibility for guard band configuration and mitigate such potential sources of interference, through the use of UE specific conditional guard band requesting. The techniques presented herein may have significant benefits. For example, the UE specific conditional guard band requesting techniques proposed herein may allow a network to have greater flexibility in scheduling (e.g., using dynamic scheduling), enabling reductions in interference, leakage, and subband emissions (SBE) while improving the quality and reliability of communications between a UE and a gNB. Thus, utilization of the techniques disclosed herein may improve overall user experience, spectral efficiency, resource utilization, and signal to interference and noise ratio (SINR) in wireless communications.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
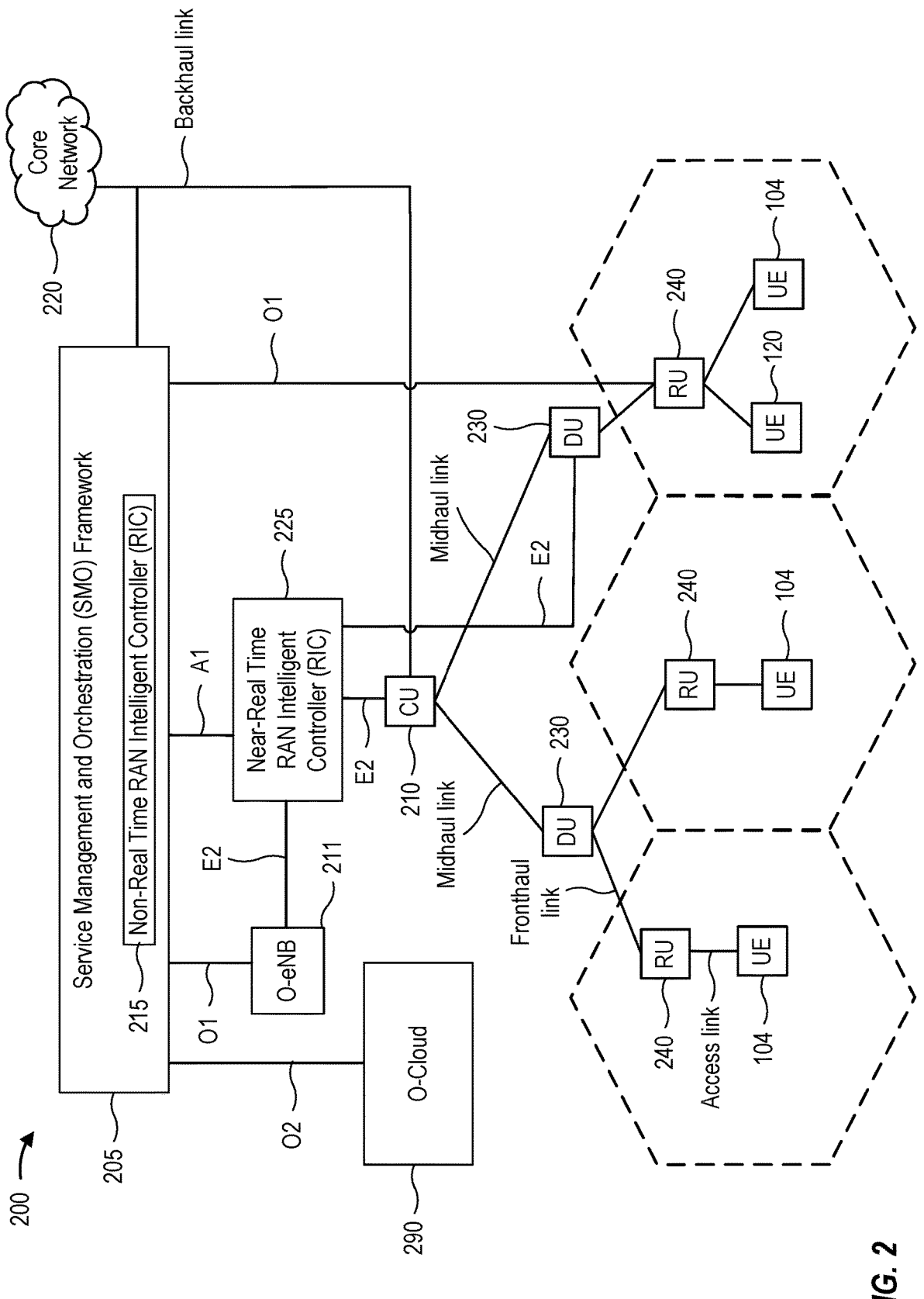
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
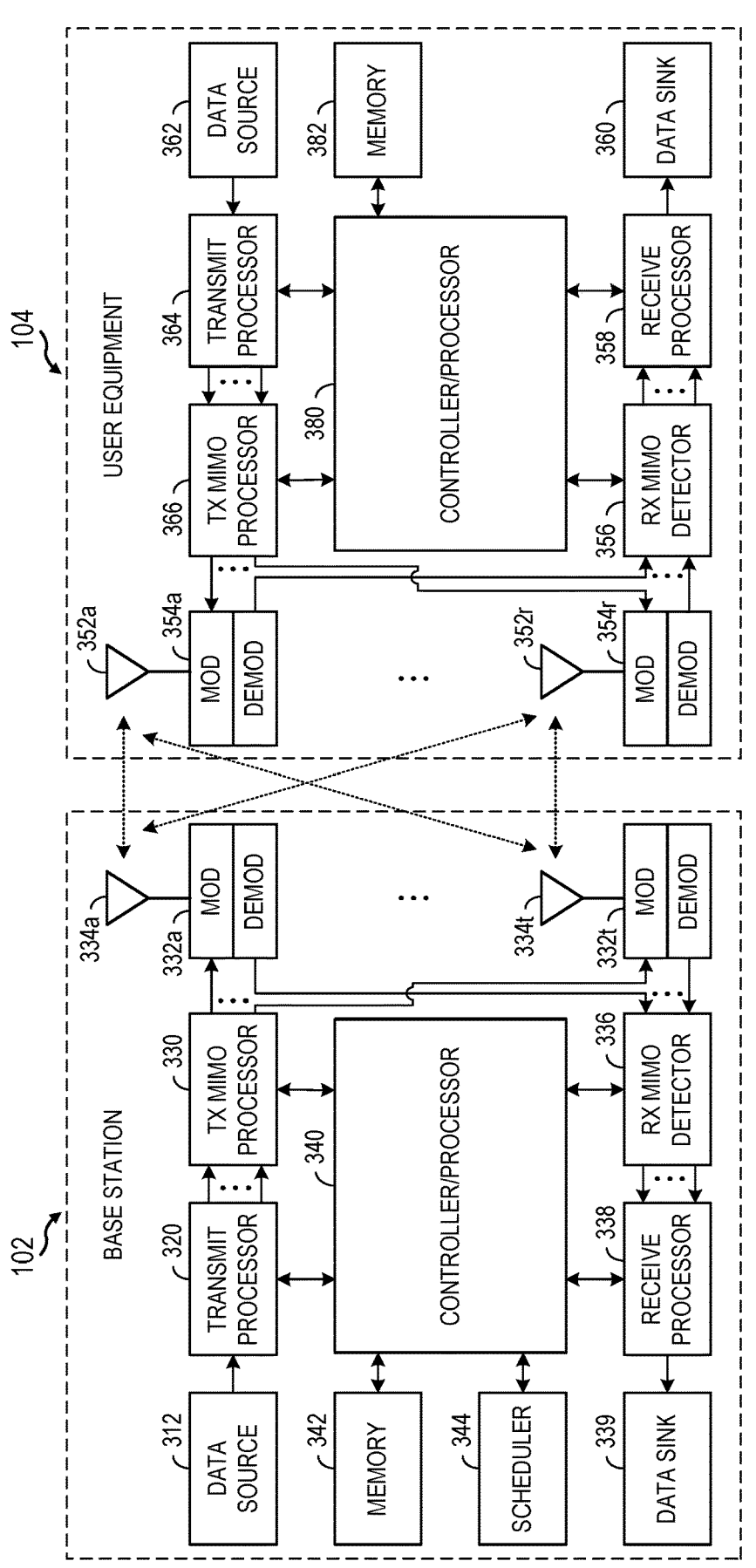
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
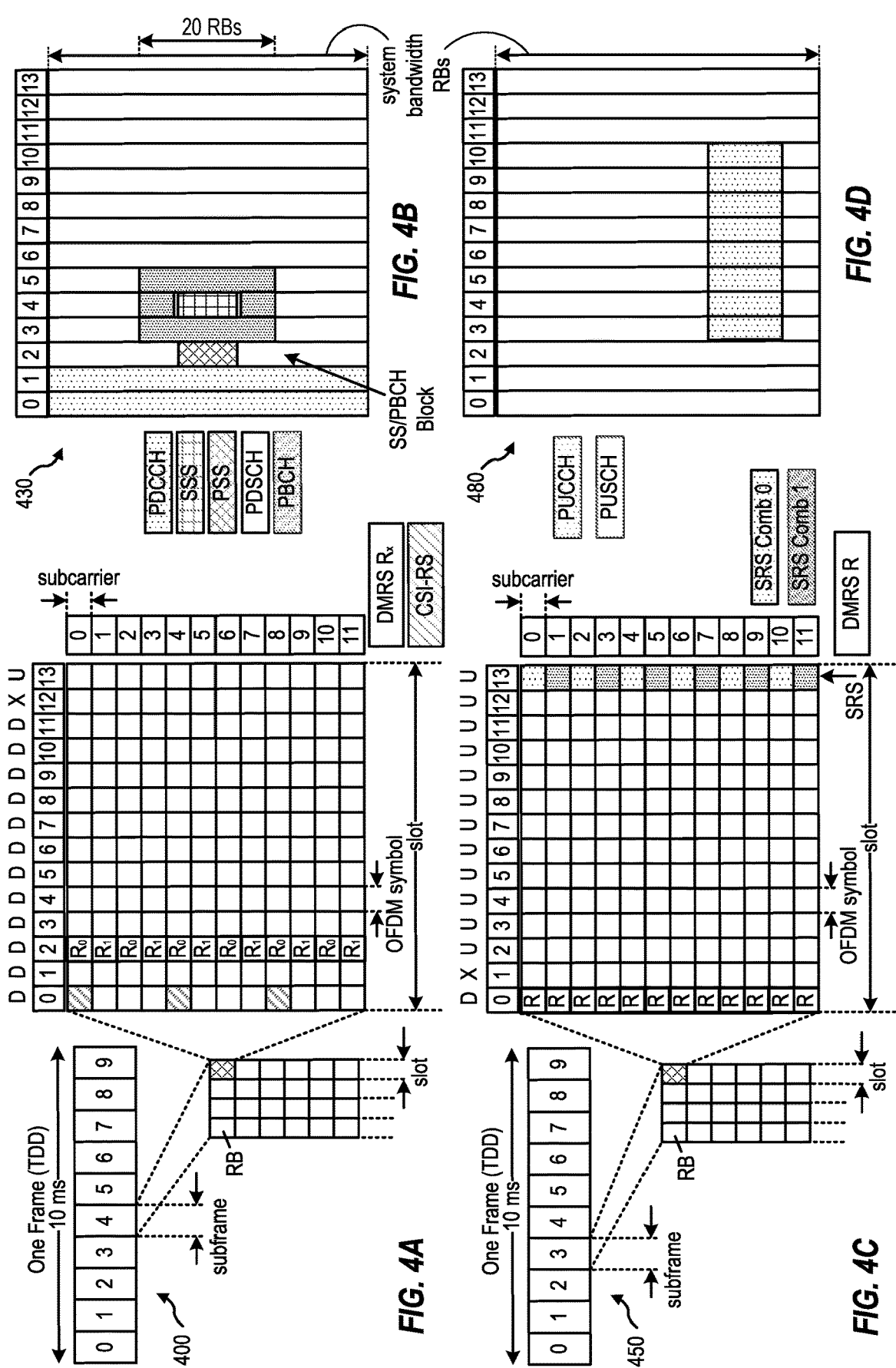
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (u) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full Duplex Communication

As noted above, a full-duplex (FD) device is capable of simultaneous bi-directional communications. In contrast, half-duplex (HD) devices are only capable of communications in one direction (transmit or receive) at one time.

Figures 5A, 5B, 5C:
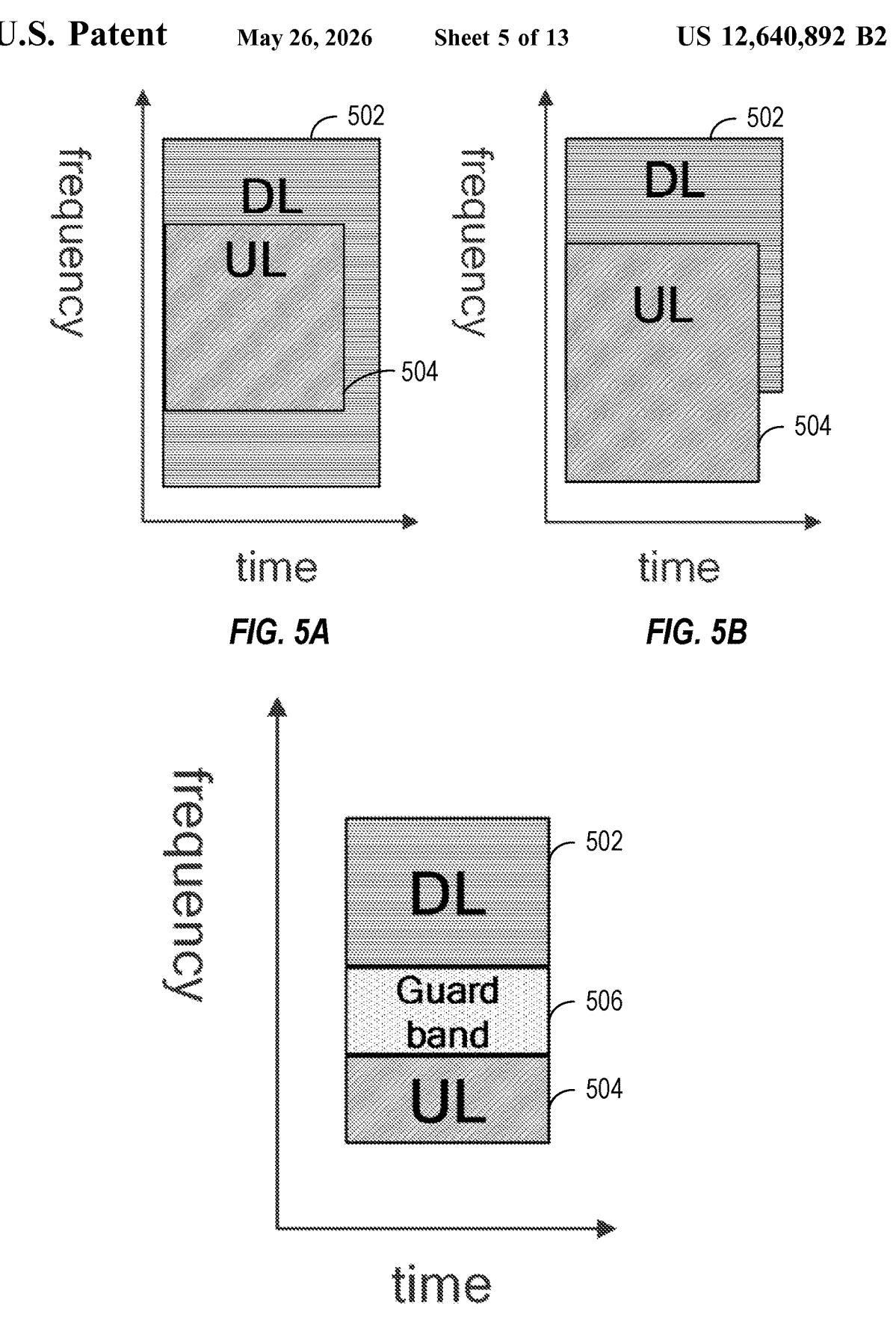
FIGS. 5A, 5B, and 5C depict various examples of full duplex (FD) time/frequency resource configurations.

Examples of FD communication modes include in-band FD (IBFD) and sub-band FD. As illustrated in FIGS. 5A and 5B, with IBFD, a device may transmit and receive on the same time and frequency resources. In this case, the downlink (DL) 502 and uplink (UL) 504 shares the same IBFD time and frequency resources which may fully overlap (FIG. 5A) or partially overlap (FIG. 5B).

As shown in FIG. 5C, with SBFD (also referred to a flexible duplexing), a device may transmit and receive at the same time, but using different frequency resources. In this case, the DL resource may be separated from the UL resource, in frequency domain, by a guard band 506.

Interference to a UE and/or a network entity (e.g., a base station such as a gNB or node of a disaggregated base station) operating in FD mode may come in the form of CLI from neighboring nodes, as well as self-interference (SI). FIG. 5A, FIG. 5B, FIG. 5C, and FIG. 5D illustrate example interference scenarios for various FD communication use cases.

As illustrated in FIG. 6A, a first scenario is when FD is enabled for a gNB (e.g., with non-overlapping UL/DL subbands) but disabled for each connected UE (which in turn may be enabled for half-duplex (HD) communication), a gNB communicates using FD capabilities. In this case, CLI between UEs, SI from the FD gNB, and CLI between the gNB and neighboring gNBs interferes with FD communication.

As illustrated in FIG. 6B, a second scenario is when FD is enabled for both a gNB and a FD UE/customer premise equipment (CPE) connected to the gNB, the gNB communicates with the FD UE using FD capabilities. If the gNB is connected to a HD UE alongside the FD UE, the gNB communicates with the HD UE. In this case, CLI between UEs, SI from the gNB and the FD UE, and CLI between the FD gNB and neighboring gNBs interferes with FD communication.

As illustrated in FIG. 6C, a third scenario is when FD is enabled for two gNBs (e.g., in a multiple TRP scenario) and enabled at one UE/CPE connected to the two gNBs. in this case, the two gNBs may communicate with the FD UE using FD capabilities. If one of the two gNBs is connected to an HD UE alongside the FD UE, the one gNB communicates with both the HD UE and the FD UE. In this case, CLI between UEs, SI from the FD UE, and CLI between the two gNBs may interfere with FD communication.

Figures 7A, 7B:
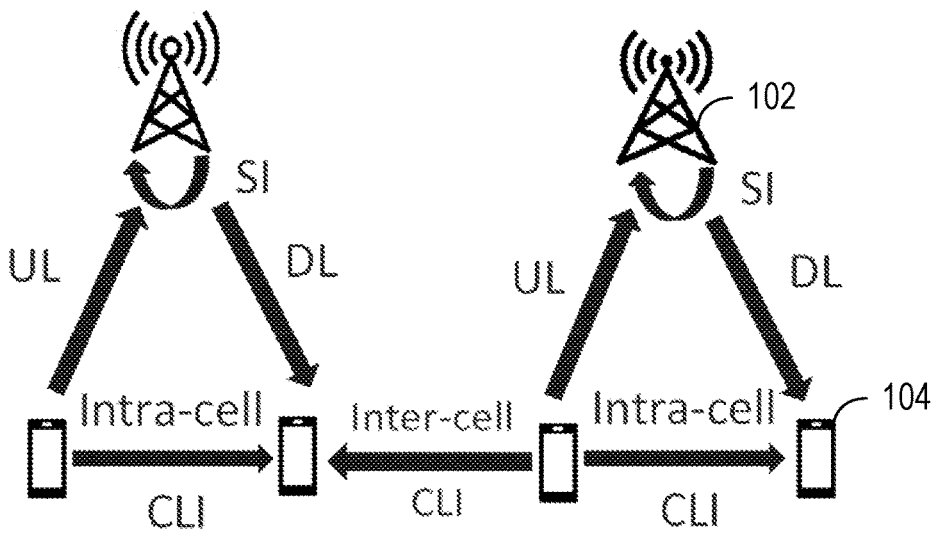
FIGS. 7A and 7B depict an example of inter-UE cross link interference (CLI).

FIG. 7A also illustrates various forms of interference for FD communications. As illustrated, if a UE 104 is operating in HD mode and a gNB 102 is operating in FD (mode) SBFD/IBFD, sources of interference at the UE include inter-cell interference from other gNBs, intra-cell CLI from UEs in the same cell, and inter-cell CLI from UEs in adjacent cells. Additionally, there may be self-interference for full-duplex UEs, particularly in SBFD slots that include both uplink subbands 754 and downlink subbands 752, as shown in FIG. 7B.

Figure 8:
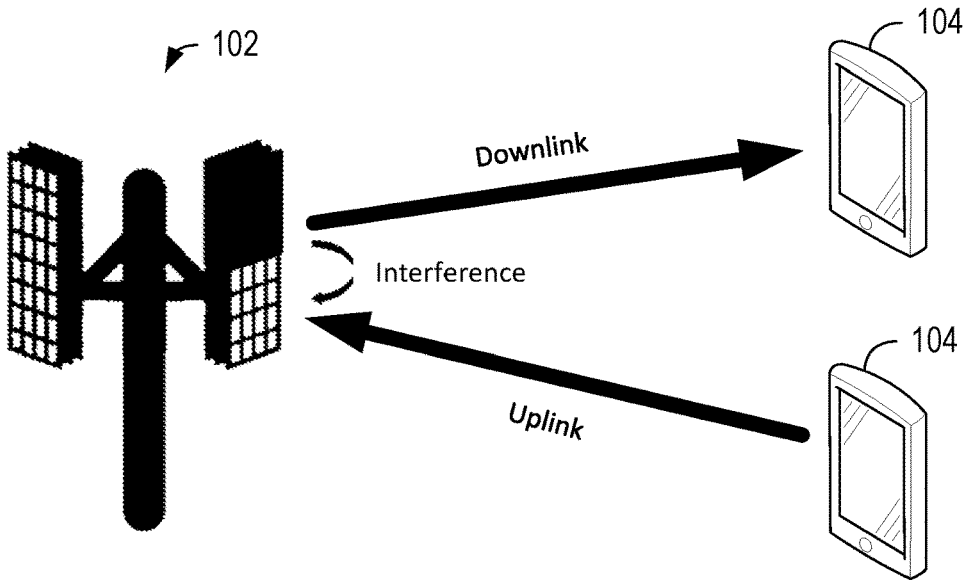
FIG. 8 depicts an example of an FD base station performing simultaneous transmission and reception on a same slot.

As noted above, an FD device is capable of bi-directional network data transmissions at the same time. FIG. 8 illustrates an example of an FD base station (a gNB) performing simultaneous transmission and reception on a same slot. As shown, the FD gNB may simultaneously perform a downlink transmission and receive an uplink transmission. As illustrated, the downlink transmission may be intended for a first UE, and the uplink transmission may be received from a second UE. In some cases, the downlink transmission and uplink transmission may both be associated with the same UE (e.g., if the UE is an FD UE). The simultaneous transmission and reception in a same slot may cause interference, as illustrated.

Aspects Related to UE Specific Conditional Guard Band Requests

As noted above, the size of guard bands may depend on several factors, including a frequency band being used, a desired level of protection against interference, and a technology used to implement SBFD. While a larger guard band provides a higher degree of protection against interference, it also reduces the available bandwidth for communication. Thus, one potential challenge is how to balance the trade-off between protection against interference and bandwidth utilization in the design of SBFD systems.

Aspects of the present disclosure provide mechanisms that may help address this potential challenge by enabling UE specific conditional guard band requesting. FIG. 9 depicts an example call flow diagram 900 illustrating techniques for UE specific conditional guard band requesting, in accordance with certain aspects of the present disclosure.

The UE and network entity depicted in FIG. 9 may be examples of UE 104 and BS 102 depicted and described with respect to FIG. 1 and FIG. 3. The network entity may be an example of a node of a disaggregated base station depicted and described with respect to FIG. 2.

As illustrated at 902, a network entity may transmit signaling, to a UE, indicating a first guard band in between subbands of at least a first pair of DL and UL subbands configured for SBFD within a slot. In some cases, the transmitted signaling may be an SBFD configuration indicating the first guard band.

According to certain aspects, the at least the first pair of downlink and uplink subbands may include a first pair comprising a first downlink subband and an uplink subband, and a second pair comprising the uplink subband and a second downlink subband. This example may be understood with reference to the diagram illustrating time/frequency resources in FIG. 6A. As illustrated, a first downlink subband, an uplink subband, and a second downlink subband may occupy subbands of a bandwidth in a same time location. In this example, a first pair may include the first downlink subband and the uplink subband (e.g., which may have a guard band allocated in between them), and a second pair may include the uplink subband (e.g., which may be common to the first and second pair) and the second downlink subband.

As another example, an SBFD configuration may have two uplink subbands and one downlink subband. In such cases, the at least one pair may include a first pair including a first uplink subband and a downlink subband and a second pair including the downlink subband and a second uplink subband.

According to certain aspects, the signaling may explicitly indicate a frequency location of the first guard band. In such cases, the UE may be implicitly indicated of frequency locations of at least the first pair of subbands that are separated by the guard band.

According to certain aspects, the signaling may implicitly indicate a frequency location of the first guard band by indicating frequency locations of subbands of at least the first pair of downlink and uplink subbands. In other words, by informing the UE of the frequency locations of a pair of subbands, the gNB is implicitly defining a frequency location of the first guard band in between the pair of subbands.

According to certain aspects, the first guard band may be a cell common guard band. In some cases, the first guard band may be determined based on gNB capability information. For example, in some cases, the first guard band may be determined based on a number of RBs required to achieve frequency isolation to meet a self-interference mitigation requirement, and/or a number of RBs required to achieve frequency isolation to meet an inter-gNB crosslink interference (CLI) mitigation requirement. In other words, if a UE is not capable of performing advanced cancellation techniques, a larger guard band may be needed.

The UE may conditionally request a UE specific guard band, for example, if one or more conditions are met that indicate the (cell specific) first guard band is insufficient for the UE.

For example, as illustrated at 904, the UE may determine that a guard band preferred by the UE is larger than the first guard band that was indicated by the network entity. In other words, the UE may determine that a larger guard band would be more advantageous or preferable to the first guard band. This preference/determination is only one example of what may meet a condition (e.g., which may be preconfigured) on which the recommendation/request that follows may be based.

According to certain aspects, a UE preferred guard band may be determined based on (associated with) a UE capability. For example, a UE may determine that N RBs are preferred to achieve frequency isolation (e.g., to meet an inter-UE CLI mitigation requirement). Different UEs may have different guard band preferences.

In some cases, a UE guard band preference may be semi-statically determined. In other words, in some cases, the preference may not change over time, and may not change when pairing with different UEs (e.g., neighbor UEs) for SBFD operation in a cell. In some cases, a UE's guard band preference may be dynamic. In other words, in some cases, the preference may change over time and may change when pairing with different UEs (e.g., close neighbor UE vs a more distant neighbor UE) for SBFD operation in a cell.

As illustrated at 906, based on this determination (e.g., based on the condition being met), the UE may transmit a request/recommendation, to the network entity, for a second guard band in between the subbands.

As noted above, the requested/recommended second guard band may be based on one or more capabilities of the UE. In such cases, the request may be transmitted via a UE capability update. According to certain aspects, the request may be transmitted using a medium access control (MAC) control element (CE) via uplink resources granted via an existing uplink grant or an uplink grant requested via a scheduling request (SR). According to certain aspects, the request may be transmitted via uplink control information (UCI). For example, the request may be piggybacked to acknowledgement (ACK) or negative ACK (NACK) signaling. In some aspects, the request may be transmitted via periodically configured UCI. According to certain aspects, the request may be signaled conditionally in order to reduce overhead. For example, in some cases, if a condition is not met, a request may not be transmitted. In some aspects, the request may be signaled semi-statically or dynamically.

As illustrated at 908, the network entity may transmit signaling, in response to the request, adjusting the first guard band. According to certain aspects, the adjustment may be dynamic. According to certain aspects, the signaling adjusting the first guard band may be group common. For example, the signaling may be at least one of group common downlink control information (DCI) or a group common MAC-CE. According to certain aspects, the signaling adjusting the first guard band may be least one of UE-specific radio resource control (RRC) signaling, UE-specific downlink control information (DCI), or a UE-specific MAC-CE.

The adjustment of the first guard band may be done by adjusting the first guard band, the second guard band, or at least one of the subbands of the at least the first pair of downlink and uplink subbands. For example, in some cases, in order to increase the size of the first guard band, a size of a downlink subband of the first pair of downlink and uplink subbands may be decreased (e.g., to increase available spectrum to allocate to the first guard band), and the size of the first guard band may be increased using the newly available spectrum. This concept is discussed further below, with reference to FIG. 10, which illustrates example adjustments in response to a UE specific conditional guard band request, in accordance with certain aspects of the present disclosure.

Figure 10A:
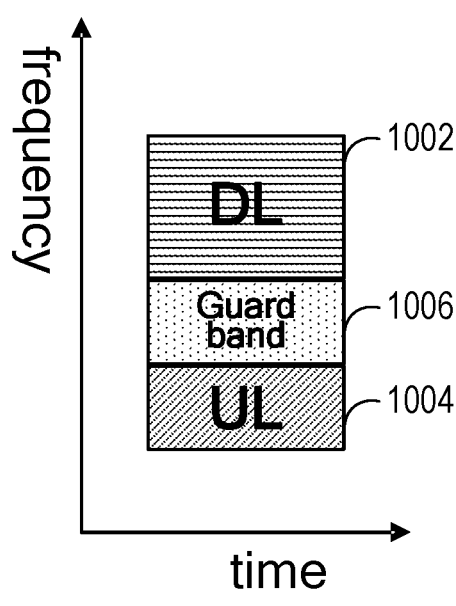
FIGS. 10A, 10B, and 10C depicts example adjustments in response to a UE specific conditional guard band request, in accordance with certain aspects of the present disclosure.

FIG. 10A illustrates a time/frequency resource allocation as depicted in FIG. 5C. As noted above, with SBFD (e.g., flexible duplexing), a device may transmit and receive at the same time, but using different frequency resources. In this case, the DL resource 1002 may be separated from the UL resource 1004, in frequency domain, by a guard band 1006.

As noted above, a UE may determine that a larger guard band would be more advantageous or preferable to a first guard band configured by a network entity. In such cases, the UE may transmit a request for an adjustment to the configured guard band.

As noted above with reference to FIG. 9, there are various methods of adjusting the first guard band (e.g., to create a guard band of greater size to accommodate the recommendation/request/preference of the UE).

Figure 10B:
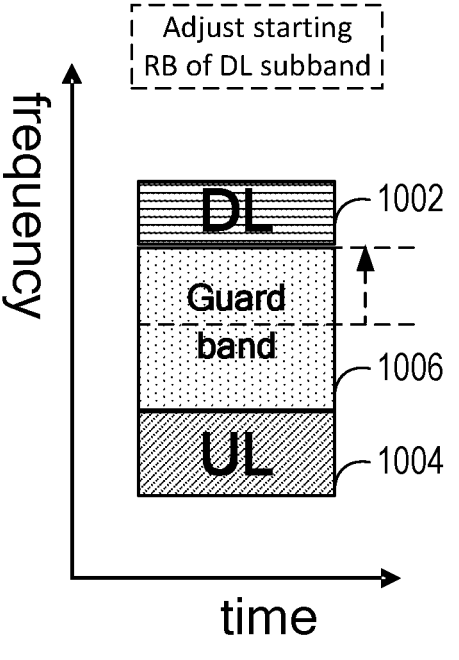

For example, as illustrated in FIG. 10B, in some cases, in order to increase the size of the first guard band, a size of a downlink subband 1002 (of the pair of the downlink subband and the uplink subband 1004) may be decreased (e.g., to increase available spectrum to allocate to the first guard band), and the size of the guard band 1006 may be increased using the newly available spectrum. As illustrated, in this case, a starting resource block (RB) of the downlink subband was adjusted, and an ending RB of the guard band was adjusted accordingly.

Figure 10C:
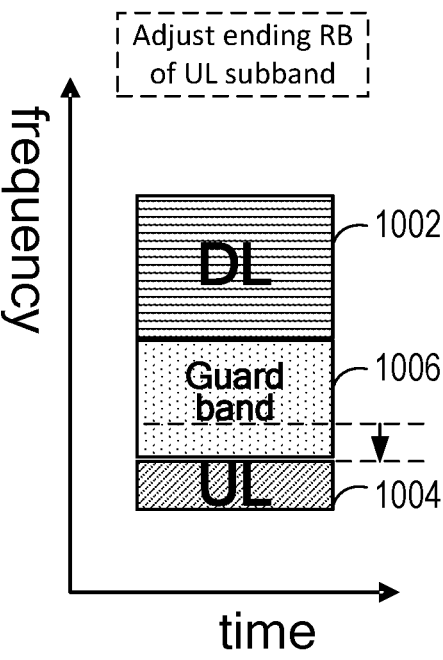

As illustrated in FIG. 10C, in some cases, in order to increase the size of the first guard band, a size of an uplink subband 1004 (of the pair of the downlink subband 1002 and the uplink subband) may be decreased (e.g., to increase available spectrum to allocate to the first guard band), and the size of the guard band 1006 may be increased using the newly available spectrum. As illustrated, in this case, an ending RB of the uplink subband was adjusted, and a starting RB of the guard band was adjusted accordingly.

The examples depicted in FIGS. 10B and 10C are not exhaustive, but they serve as illustrative examples of how resource allocations may be adjusted in response to a conditional request for a guard band adjustment by a UE, according to certain aspects of the present disclosure.

Example Operations

Figure 11:
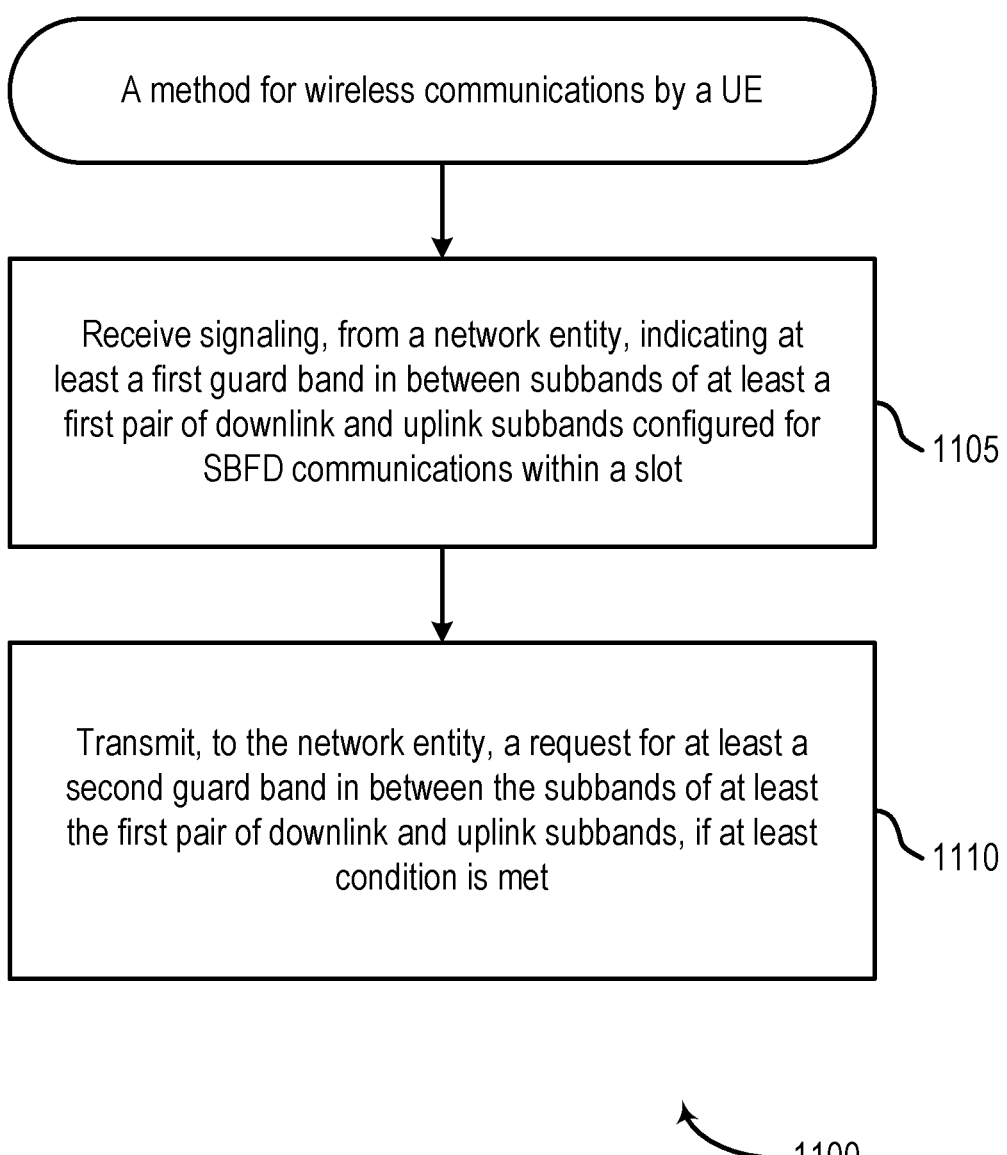
FIG. 11 depicts a method for wireless communications.

FIG. 11 shows an example of a method 1100 of wireless communications by a UE, such as a UE 104 of FIGS. 1 and 3.

Method 1100 begins at step 1105 with receiving signaling, from a network entity, indicating at least a first guard band in between subbands of at least a first pair of downlink and uplink subbands configured for SBFD communications within a slot. In some cases, the operations of this step refer to, or may be performed by, circuitry for receiving and/or code for receiving as described with reference to FIG. 13.

Method 1100 then proceeds to step 1110 with transmitting, to the network entity, a request for at least a second guard band in between the subbands of at least the first pair of downlink and uplink subbands, if at least condition is met. In some cases, the operations of this step refer to, or may be performed by, circuitry for transmitting and/or code for transmitting as described with reference to FIG. 13.

In some aspects, the first guard band comprises a cell-common guard band; and the second guard band comprises a UE-specific guard band.

In some aspects, the signaling indicates the first guard band by indicating frequency locations of the subbands of at least the first pair of downlink and uplink subbands.

In some aspects, the signaling explicitly indicates a frequency location of the first guard band.

In some aspects, the at least one condition is met when a guard band recommended by the UE is larger than the first guard band.

In some aspects, the guard band recommended by the UE is based on one or more capabilities of the UE.

In some aspects, the request is transmitted via a UE capability update.

In some aspects, the request is transmitted using a MAC-CE via uplink resources granted via an existing uplink grant or an uplink grant requested via a SR.

In some aspects, the request is transmitted via UCI.

In some aspects, the request is signaled semi-statically or dynamically.

In some aspects, the method 1100 further includes receiving, in response to the request, signaling adjusting at least one of the first guard band the second guard band, or at least one of the subbands of at least the first pair of downlink and uplink subbands. In some cases, the operations of this step refer to, or may be performed by, circuitry for receiving and/or code for receiving as described with reference to FIG. 13.

In some aspects, the signaling adjusting at least one of the first guard band, the second guard band, or at least one of the subbands of at least the first pair of downlink and uplink subbands comprises at least one of group common DCI or a group common MAC-CE.

In some aspects, the signaling adjusting at least one of the first guard band, the second guard band, or at least one of the subbands of at least the first pair of downlink and uplink subbands comprises at least one of UE-specific RRC signaling, UE-specific DCI, or a UE-specific MAC-CE.

In some aspects, the UE comprises an SBFD-aware UE.

In some aspects, the at least the first pair of downlink and uplink subbands comprises: a first pair comprising a first downlink subband and an uplink subband, and a second pair comprising the uplink subband and a second downlink subband.

Figure 13:
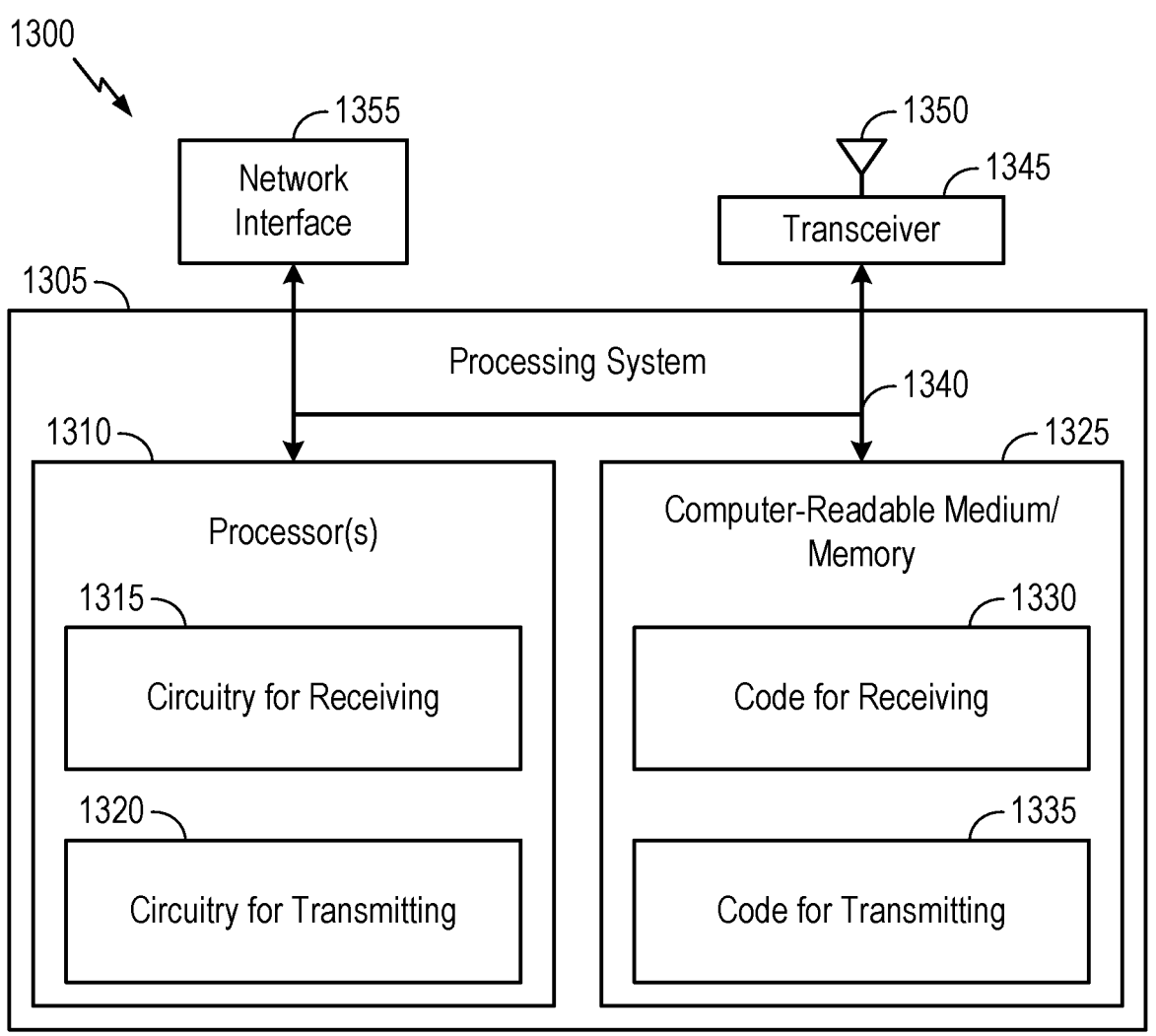
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

FIG. 12 shows an example of a method 1200 of wireless communications by a network entity, such as a BS 102 of FIGS. 1 and 3, or a disaggregated base station as discussed with respect to FIG. 2.

Method 1200 begins at step 1205 with transmitting signaling, to a UE, indicating at least a first guard band in between subbands of at least a first pair of downlink and uplink subbands configured for SBFD communications within a slot. In some cases, the operations of this step refer to, or may be performed by, circuitry for transmitting and/or code for transmitting as described with reference to FIG. 13.

Method 1200 then proceeds to step 1210 with receiving, from the UE, a request for at least a second guard band in between the subbands of at least the first pair of downlink and uplink subbands. In some cases, the operations of this step refer to, or may be performed by, circuitry for receiving and/or code for receiving as described with reference to FIG. 13.

In some aspects, the first guard band comprises a cell-common guard band; and the second guard band comprises a UE-specific guard band.

In some aspects, the signaling indicates the first guard band by indicating frequency locations of the subbands of at least the first pair of downlink and uplink subbands.

In some aspects, the signaling explicitly indicates a frequency location of the first guard band.

In some aspects, the request is received via a UE capability update.

In some aspects, the request is received in a MAC-CE transmitted via uplink resources granted by an existing uplink grant or an uplink grant requested via a SR.

In some aspects, the request is received via UCI.

In some aspects, the request is signaled semi-statically or dynamically.

In some aspects, the method 1200 further includes transmitting, in response to the request, signaling adjusting at least one of the first guard band the second guard band, or at least one of the subbands of at least the first pair of downlink and uplink subbands. In some cases, the operations of this step refer to, or may be performed by, circuitry for transmitting and/or code for transmitting as described with reference to FIG. 13.

In some aspects, the signaling adjusting at least one of the first guard band, the second guard band, or at least one of the subbands of at least the first pair of downlink and uplink subbands comprises at least one of group common DCI or a group common MAC-CE.

In some aspects, the signaling adjusting at least one of the first guard band, the second guard band, or at least one of the subbands of at least the first pair of downlink and uplink subbands comprises at least one of UE-specific RRC signaling, UE-specific DCI, or a UE-specific MAC-CE.

In some aspects, the UE comprises an SBFD-aware UE.

In some aspects, the at least the first pair of downlink and uplink subbands comprises: a first pair comprising a first downlink subband and an uplink subband, and a second pair comprising the uplink subband and a second downlink subband.

In one aspect, method 1200, or any aspect related to it, may be performed by an apparatus, such as communications device 1300 of FIG. 13, which includes various components operable, configured, or adapted to perform the method 1200. Communications device 1300 is described below in further detail.

Note that FIG. 12 is just one example of a method, and other methods including fewer, additional, or alternative steps are possible consistent with this disclosure.

Example Communications Device(s)

FIG. 13 depicts aspects of an example communications device 1300. In some aspects, communications device 1300 is a user equipment, such as UE 104 described above with respect to FIGS. 1 and 3. In some aspects, communications device 1300 is a network entity, such as BS 102 of FIGS. 1 and 3, or a disaggregated base station as discussed with respect to FIG. 2.

The communications device 1300 includes a processing system 1305 coupled to the transceiver 1345 (e.g., a transmitter and/or a receiver). In some aspects (e.g., when communications device 1300 is a network entity), processing system 1305 may be coupled to a network interface 1355 that is configured to obtain and send signals for the communications device 1300 via communication link(s), such as a backhaul link, midhaul link, and/or fronthaul link as described herein, such as with respect to FIG. 2. The transceiver 1345 is configured to transmit and receive signals for the communications device 1300 via the antenna 1350, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1325 via a bus 1340. In certain aspects, the computer-readable medium/memory 1325 is configured to store instructions (e.g., computer-executable code) that when executed by the one or more processors 1310, cause the one or more processors 1310 to perform the method 1100 described with respect to FIG. 11, or any aspect related to it; and the method 1200 described with respect to FIG. 12, or any aspect related to it. Note that reference to a processor performing a function of communications device 1300 may include one or more processors 1310 performing that function of communications device 1300.

In the depicted example, computer-readable medium/memory 1325 stores code (e.g., executable instructions), such as code for receiving 1330 and code for transmitting 1335. Processing of the code for receiving 1330 and code for transmitting 1335 may cause the communications device 1300 to perform the method 1100 described with respect to FIG. 11, or any aspect related to it; and the method 1200 described with respect to FIG. 12, or any aspect related to it.

The one or more processors 1310 include circuitry configured to implement (e.g., execute) the code stored in the computer-readable medium/memory 1325, including circuitry for receiving 1315 and circuitry for transmitting 1320. Processing with circuitry for receiving 1315 and circuitry for transmitting 1320 may cause the communications device 1300 to perform the method 1100 described with respect to FIG. 11, or any aspect related to it; and the method 1200 described with respect to FIG. 12, or any aspect related to it.

Various components of the communications device 1300 may provide means for performing the method 1100 described with respect to FIG. 11, or any aspect related to it; and the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1345 and the antenna 1350 of the communications device 1300 in FIG. 13. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1345 and the antenna 1350 of the communications device 1300 in FIG. 13.

Example Clauses

Implementation examples are described in the following numbered clauses:

Clause 1: A method for wireless communications by a UE, comprising: receiving signaling, from a network entity, indicating at least a first guard band in between subbands of at least a first pair of downlink and uplink subbands configured for SBFD communications within a slot; and transmitting, to the network entity, a request for at least a second guard band in between the subbands of at least the first pair of downlink and uplink subbands, if at least condition is met.

Clause 2: The method of Clause 1, wherein: the first guard band comprises a cell-common guard band; and the second guard band comprises a UE-specific guard band.

Clause 3: The method of any one of Clauses 1 and 2, wherein: the signaling indicates the first guard band by indicating frequency locations of the subbands of at least the first pair of downlink and uplink subbands.

Clause 4: The method of any one of Clauses 1-3, wherein the signaling explicitly indicates a frequency location of the first guard band.

Clause 5: The method of any one of Clauses 1-4, wherein the at least one condition is met when a guard band recommended by the UE is larger than the first guard band.

Clause 6: The method of Clause 5, wherein the guard band recommended by the UE is based on one or more capabilities of the UE.

Clause 7: The method of any one of Clauses 1-6, wherein the request is transmitted via a UE capability update.

Clause 8: The method of any one of Clauses 1-7, wherein the request is transmitted using a MAC-CE via uplink resources granted via an existing uplink grant or an uplink grant requested via a SR.

Clause 9: The method of any one of Clauses 1-8, wherein the request is transmitted via UCI.

Clause 10: The method of any one of Clauses 1-9, wherein the request is signaled semi-statically or dynamically.

Clause 11: The method of any one of Clauses 1-10, further comprising receiving, in response to the request, signaling adjusting at least one of the first guard band the second guard band, or at least one of the subbands of at least the first pair of downlink and uplink subbands.

Clause 12: The method of Clause 11, wherein the signaling adjusting at least one of the first guard band, the second guard band, or at least one of the subbands of at least the first pair of downlink and uplink subbands comprises at least one of group common DCI or a group common MAC-CE.

Clause 13: The method of Clause 11, wherein the signaling adjusting at least one of the first guard band, the second guard band, or at least one of the subbands of at least the first pair of downlink and uplink subbands comprises at least one of UE-specific RRC signaling, UE-specific DCI, or a UE-specific MAC-CE.

Clause 14: The method of any one of Clauses 1-13, wherein the UE comprises an SBFD-aware UE.

Clause 15: The method of any one of Clauses 1-14, wherein the at least the first pair of downlink and uplink subbands comprises: a first pair comprising a first downlink subband and an uplink subband, and a second pair comprising the uplink subband and a second downlink subband.

Clause 16: A method for wireless communications by a network entity, comprising: transmitting signaling, to a UE, indicating at least a first guard band in between subbands of at least a first pair of downlink and uplink subbands configured for SBFD communications within a slot; and receiving, from the UE, a request for at least a second guard band in between the subbands of at least the first pair of downlink and uplink subbands.

Clause 17: The method of Clause 16, wherein: the first guard band comprises a cell-common guard band; and the second guard band comprises a UE-specific guard band.

Clause 18: The method of any one of Clauses 16 and 17, wherein: the signaling indicates the first guard band by indicating frequency locations of the subbands of at least the first pair of downlink and uplink subbands.

Clause 19: The method of any one of Clauses 16-18, wherein the signaling explicitly indicates a frequency location of the first guard band.

Clause 20: The method of any one of Clauses 16-19, wherein the request is received via a UE capability update.

Clause 21: The method of any one of Clauses 16-20, wherein the request is received in a MAC-CE transmitted via uplink resources granted by an existing uplink grant or an uplink grant requested via a SR.

Clause 22: The method of any one of Clauses 16-21, wherein the request is received via UCI.

Clause 23: The method of any one of Clauses 16-22, wherein the request is signaled semi-statically or dynamically.

Clause 24: The method of any one of Clauses 16-23, further comprising transmitting, in response to the request, signaling adjusting at least one of the first guard band the second guard band, or at least one of the subbands of at least the first pair of downlink and uplink subbands.

Clause 25: The method of Clause 24, wherein the signaling adjusting at least one of the first guard band, the second guard band, or at least one of the subbands of at least the first pair of downlink and uplink subbands comprises at least one of group common DCI or a group common MAC-CE.

Clause 26: The method of Clause 24, wherein the signaling adjusting at least one of the first guard band, the second guard band, or at least one of the subbands of at least the first pair of downlink and uplink subbands comprises at least one of UE-specific RRC signaling, UE-specific DCI, or a UE-specific MAC-CE.

Clause 27: The method of any one of Clauses 16-26, wherein the UE comprises an SBFD-aware UE.

Clause 28: The method of any one of Clauses 16-27, wherein the at least the first pair of downlink and uplink subbands comprises: a first pair comprising a first downlink subband and an uplink subband, and a second pair comprising the uplink subband and a second downlink subband.

Clause 29: An apparatus, comprising: a memory comprising executable instructions; and a processor configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by a processor of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
receiving signaling, from a network entity, indicating at least a first guard band in between subbands of at least a first pair of downlink and uplink subbands configured for subband full duplex (SBFD) communications within a slot; and
transmitting, via a UE capability update to the network entity, after receiving the signaling indicating the first guard band, a request for at least a second guard band in between the subbands of at least the first pair of downlink and uplink subbands, if at least one condition is met, wherein the second guard band comprises the first guard band having one or more adjustments.

2. The method of claim 1, wherein:
the first guard band comprises a cell-common guard band; and
the second guard band comprises a UE-specific guard band.

3. The method of claim 1, wherein:
the signaling indicates the first guard band by indicating frequency locations of the subbands of at least the first pair of downlink and uplink subbands.

4. The method of claim 1, wherein the signaling explicitly indicates a frequency location of the first guard band.

5. The method of claim 1, wherein the at least one condition is met when a guard band recommended by the UE is larger than the first guard band.

6. The method of claim 5, wherein the guard band recommended by the UE is based on one or more capabilities of the UE.

7. The method of claim 1, wherein the request is signaled semi-statically or dynamically.

8. The method of claim 1, further comprising receiving, in response to the request, signaling adjusting at least one of the first guard band, the second guard band, or at least one of the subbands of at least the first pair of downlink and uplink subbands.

9. The method of claim 8, wherein the signaling adjusting at least one of the first guard band, the second guard band, or at least one of the subbands of at least the first pair of downlink and uplink subbands comprises at least one of group common downlink control information (DCI) or a group common medium access control (MAC) control element (CE).

10. The method of claim 8, wherein the signaling adjusting at least one of the first guard band, the second guard band, or at least one of the subbands of at least the first pair of downlink and uplink subbands comprises at least one of UE-specific radio resource control (RRC) signaling, UE-specific downlink control information (DCI), or a UE-specific medium access control (MAC) control element (CE).

11. The method of claim 1, wherein the UE comprises an SBFD-aware UE.

12. The method of claim 1, wherein the at least the first pair of downlink and uplink subbands comprises:
a first pair comprising a first downlink subband and an uplink subband, and
a second pair comprising the uplink subband and a second downlink subband.

13. A method for wireless communications by a network entity, comprising:
transmitting signaling, to a user equipment (UE), indicating at least a first guard band in between subbands of at least a first pair of downlink and uplink subbands configured for subband full duplex (SBFD) communications within a slot; and
receiving, via a UE capability update from the UE, after transmitting the signaling indicating the first guard band, a request for at least a second guard band in between the subbands of at least the first pair of downlink and uplink subbands, wherein the second guard band comprises the first guard band having one or more adjustments.

14. The method of claim 13, wherein:
the first guard band comprises a cell-common guard band; and
the second guard band comprises a UE-specific guard band.

15. The method of claim 13, wherein:
the signaling indicates the first guard band by indicating frequency locations of the subbands of at least the first pair of downlink and uplink subbands.

16. The method of claim 13, wherein the signaling explicitly indicates a frequency location of the first guard band.

17. The method of claim 13, wherein the request is signaled semi-statically or dynamically.

18. The method of claim 13, further comprising transmitting, in response to the request, signaling adjusting at least one of the first guard band, the second guard band, or at least one of the subbands of at least the first pair of downlink and uplink subbands.

19. The method of claim 18, wherein the signaling adjusting at least one of the first guard band, the second guard band, or at least one of the subbands of at least the first pair of downlink and uplink subbands comprises at least one of group common downlink control information (DCI) or a group common medium access control (MAC) control element (CE).

20. The method of claim 18, wherein the signaling adjusting at least one of the first guard band, the second guard band, or at least one of the subbands of at least the first pair of downlink and uplink subbands comprises at least one of UE-specific radio resource control (RRC) signaling, UE-specific downlink control information (DCI), or a UE-specific medium access control (MAC) control element (CE).

21. The method of claim 13, wherein the UE comprises an SBFD-aware UE.

22. The method of claim 13, wherein the at least the first pair of downlink and uplink subbands comprises:
a first pair comprising a first downlink subband and an uplink subband, and
a second pair comprising the uplink subband and a second downlink subband.

23. An apparatus, comprising: memory comprising executable instructions; and one or more processors configured, individually or collectively, to execute the executable instructions and cause the apparatus to:

receive signaling, from a network entity, indicating at least a first guard band in between subbands of at least a first pair of downlink and uplink subbands configured for subband full duplex (SBFD) communications within a slot; and transmit, via a UE capability update to the network entity, after receiving the signaling indicating the first guard band, a request for at least a second guard band in between the subbands of at least the first pair of downlink and uplink subbands, if at least one condition is met, wherein the second guard band comprises the first guard band having one or more adjustments.

24. An apparatus, comprising: memory comprising executable instructions; and one or more processors configured, individually or collectively, to execute the executable instructions and cause the apparatus to:

transmit signaling, to a user equipment (UE), indicating at least a first guard band in between subbands of at least a first pair of downlink and uplink subbands configured for subband full duplex (SBFD) communications within a slot; and receive, via a UE capability update from the UE, after transmitting the signaling indicating the first guard band, a request for at least a second guard band in between the subbands of at least the first pair of downlink and uplink subbands, wherein the second guard band comprises the first guard band having one or more adjustments.

\* \* \* \* \*